Figure 1:
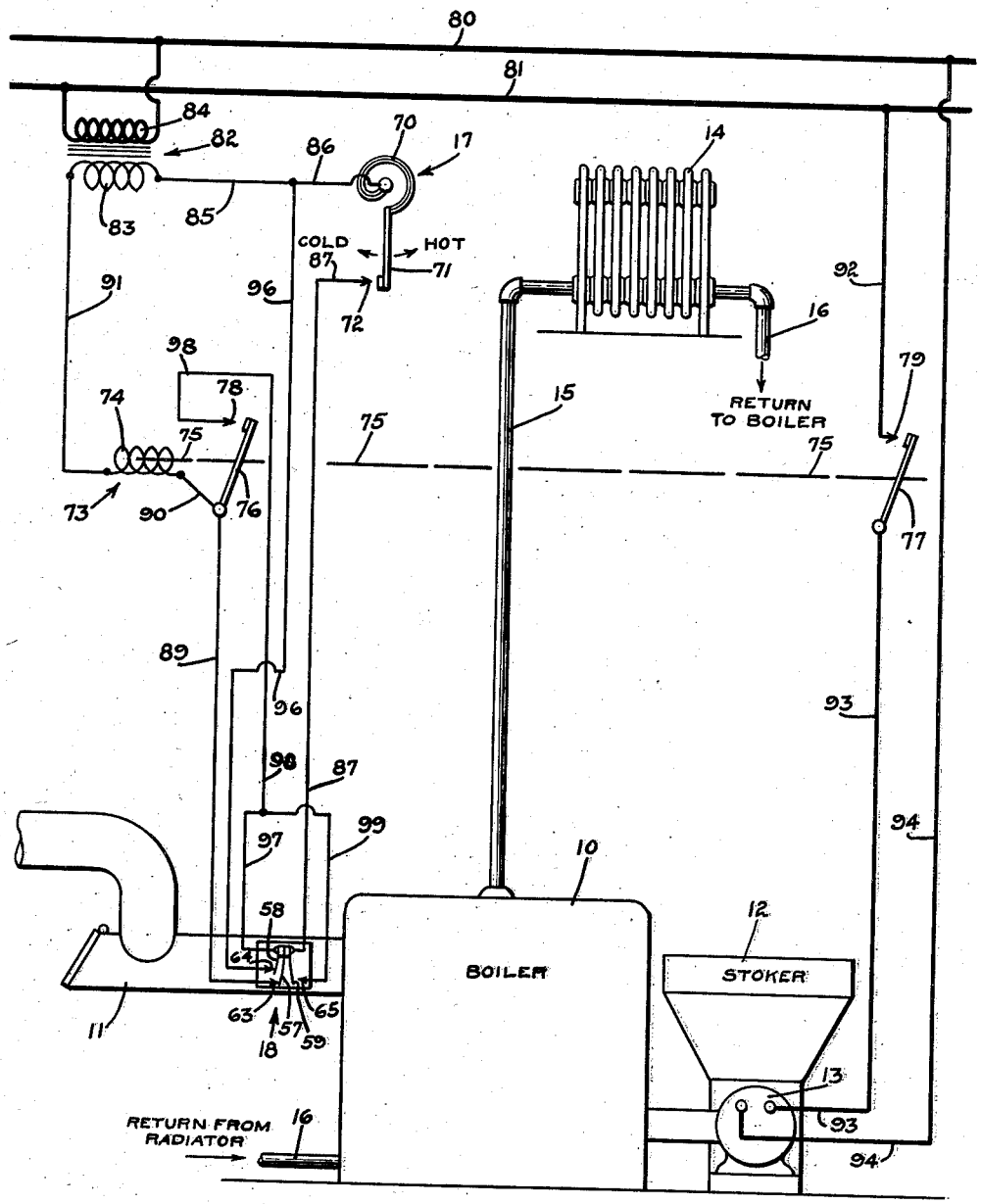

Sept. 21, 1937.　　　W. M. SCHWEICKART　　　2,093,649
CONTROL APPARATUS AND METHOD
Filed Jan. 5, 1935　　　2 Sheets-Sheet 2

INVENTOR
WILLIAM M. SCHWEICKART
BY
ATTORNEYS

Patented Sept. 21, 1937

2,093,649

UNITED STATES PATENT OFFICE 2,093,649

CONTROL APPARATUS AND METHOD

William M. Schweickart, Euclid, Ohio, assignor to Minneapolis-Honeywell Regulator Company, Minneapolis, Minn., a corporation of Delaware Application January 5, 1935, Serial No. 532

8 Claims. (Cl. 236—9)

The present invention relates to an improved method and system by which a condition or force may be maintained more nearly at the desired value than has been possible by prior systems and methods.

One of the objects of the present invention is the provision of a system for controlling the value of a condition or force in which a condition or force changing device is controlled by the cooperative action of two devices, one of which responds to one condition or force and the other of which responds to changes in another condition or force produced directly by the condition or force changing means or responds to changes in the effectiveness of the condition or force changing means, such changes having no definite relation to the actual value of the condition, force, or effectiveness.

In the particular embodiment of the invention to be hereinafter described, the condition or force changing device takes the form of a temperature changer and particularly a heater, such as a boiler fired by any suitable means, for instance, the well known electrically operated coal stoker. The condition to which one of the control devices responds is a temperature condition and may well be the temperature of a space to be controlled. The other control device, in the case of a heating system, responds to changes in some condition directly produced by the heater such as changes in heater temperature or pressure, although in the preferred embodiment of the invention, this device responds to changes in stack temperature. In order to render this second control device responsive to changes as distinguished from actual values, it preferably comprises a control element, such as a switch or a plurality of switches, that is associated with a device responsive to actual values through the medium of the well known non-positive transmission means or slip-frictional connection.

A further object of the invention is the provision of a new method for controlling the value of a condition or force which method includes the steps of placing a condition or force changing device into operation when a first condition or force reaches a given value, then maintaining operation of said condition or force changing device independently of said first condition or force until there is a predetermined change in a second condition or force or in the effectiveness of the condition or force changing device, and thereafter controlling the condition or force changing device in accordance with the value of said first condition or force.

Another object of the invention is the provision of a condition or force changing system in which a condition or force changing device is placed in operation by a first control device responsive to actual values of a first condition or force and then maintained in operation by means of a second control device responsive to changes in another condition or force, or responsive to changes in the effectiveness of the condition or force changing device. In the preferred embodiment of the invention, the control of the condition or force changing device is returned to the first control device after the other condition or force or the effectiveness of the condition or force changing device has changed in one direction a predetermined amount. Also, preferably, the arrangement is such that the first control device is incapable of placing the condition or force changing device in operation until the other condition or force, or the effectiveness of the condition or force changing device, has changed at least a predetermined amount in the opposite direction.

The system of the present invention has particular utility in connection with control systems including a sensitive single circuit switching mechanism for controlling a relay. Such systems, while extremely sensitive, are often objectionable in that their extreme sensitiveness often results in a rapid energization and deenergization of the relay, commonly called "relay chatter". In the present system, the relay is initially energized by the closure of a sensitive single circuit switching mechanism. The relay is then held energized by a holding circuit which is independent of the main control switch. This holding circuit is controlled by a switch responsive to predetermined changes in some other condition or force, or to the effectiveness of the condition or force changing device being controlled. After the predetermined change occurs, the relay is maintained energized by the main controlling switch if it still be in closed position. Furthermore, the main controlling switch is incapable of initially energizing the relay unless there has been a predetermined change in the other condition or force, or in the effectiveness of the condition or force changing device. In this manner, every time the relay is energized, it will be held energized for at least a short period. It is to be particularly noted, that this holding circuit for the relay is not based upon absolute time, but is based upon some condition or force having a relation to the control system as a whole.

A further object of the invention therefore is the provision of a simple electrical control system which eliminates relay chatter by providing a temporary holding circuit which is controlled by some means having a definite relationship to the control system as a whole, as distinguished from a straight timed temporary holding circuit.

Further objects of the invention will be found in the detailed description, the drawings and the claims.

Figure 3:
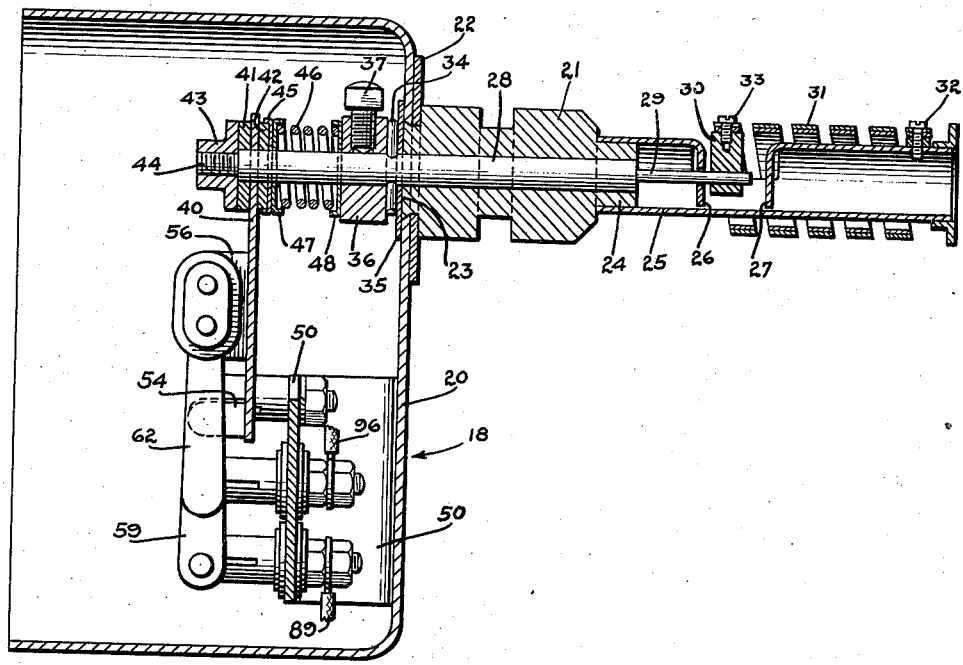
Figure 2:
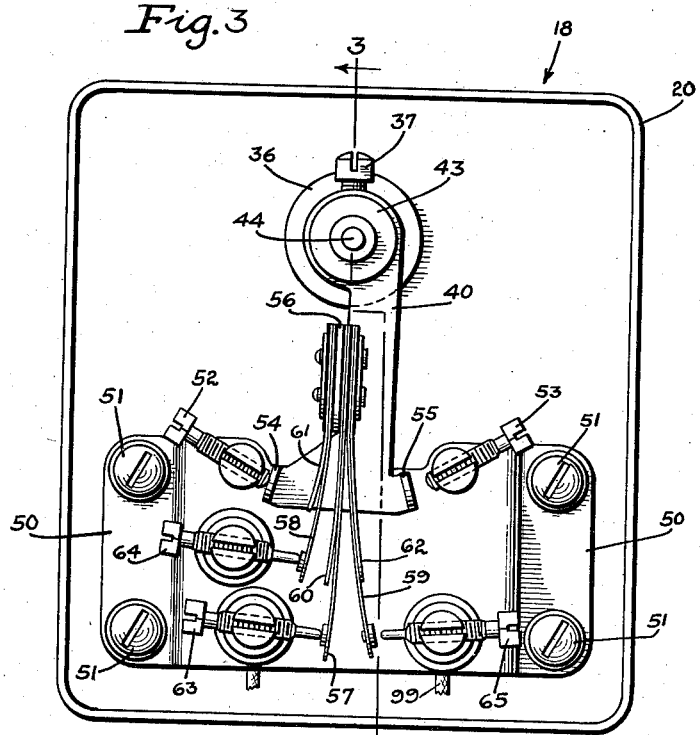

For a more complete understanding of the invention, reference may be had to the following description and the accompanying drawings illustrative of one embodiment of the present invention and, in which:

Fig. 1 is a diagrammatic showing of a system constructed in accordance with the present invention, Fig. 2 is a front view of one of the control devices used in the system of Fig. 1, and Fig. 3 is a sectional view taken about on the line 3—3 of Fig. 2.

Referring first to Fig. 1 of the drawings, a condition or force changing device is herein shown as comprising a boiler 10 which is provided with the usual stack pipe 11. The boiler 10 is shown as being fired by a coal stoker 12 of any well known construction which is operated by an electric stoker motor 13 in the usual manner. The boiler 10 operates to supply a heating medium to a radiator 14, located in the space to be heated, by means of a supply pipe 15. The fluid medium after passing through the radiator 14 returns to the boiler 10 by means of a return pipe 16. It will be understood that this showing of the boiler 10 and radiator 14 is merely exemplary of one type of condition or force changing device or temperature changing means and that others could be substituted therefor without departing from the spirit of this invention. It will be further understood that this heating system should be supplied with the usual fixtures, such as traps, etc., as is well known in the art.

The stoker motor 13 is primarily controlled by a condition or force responsive device, indicated generally at 17, herein shown in the form of a thermostatic switch that preferably responds to the temperature of the space being heated. The stoker motor 13 is additionally controlled by a control device, generally indicated at 18, which responds to changes in another condition or force or responds to changes in the effectiveness of the boiler 10, and is herein shown as comprising a slip friction switching mechanism responsive to changes in the temperature of the gases passing through the stack pipe 11.

Turning now to Figs. 2 and 3, the slip friction switching mechanism, generally indicated at 18, comprises a casing 20 of substantially square configuration. To the rear wall of casing 20 is secured a cylindrical mounting member 21, there being a washer or spacer 22 interposed between the cylindrical mounting member 21 and the rear wall of the casing 20. The cylindrical mounting member 21 may be secured to the rear wall of casing 20 in any suitable manner such as by peening over a reduced portion which extends through the casing 20 as indicated at 23. The outer end of mounting member 21 is provided with a reduced portion 24 over which is placed a tubular member 25, the tubular member 25 being secured to the mounting member 21 by any suitable means such as by brazing. The tubular member 25 has a portion of its surface stamped inwardly to provide a pair of flanges 26 and 27.

A torsion rod 28, having one of its ends terminating within casing 20, extends through mounting member 21 and is provided with a reduced portion 29 which extends through flange 26 and terminates between flanges 26 and 27. A metallic block 30 is suitably secured to the end of reduced portion 29. One end of a bimetallic helically coiled element 31 is secured to tubular member 25 by means of a screw 32, whereas its other end is secured to metallic block 30 by means of a screw 33. Excessive axial movement of torsion rod 28 towards the left (as viewed in Fig. 3) is prevented by engagement of block 30 with the flange 26 while excessive axial movement in the other direction is prevented by a cotter pin 34 which extends through torsion rod 28 at a point just within the casing 20. Preferably, a washer 35 is placed between cotter pin 34 and the inside surface of the back wall of casing 20.

Just within the casing 20 a stop member 36 is secured to torsion rod 28 by means of a set screw 37. The torsion rod 28 further carries a switch operating arm 40 that is loosely mounted thereon. On each side of this switch operating arm 40 is placed friction washers 41 and 42. Movement of friction washer 41 to the left is prevented by a nut 43 which is threaded upon a reduced terminal portion 44 of torsion rod 28. The friction washer 42 is received by a cup 45. The switch actuating arm 40 is resiliently clamped between the friction washers 41 and 42 by a coiled compression spring 46 which is held by a pair of spring retainers 47 and 48, one of which abuts the cup 45 and the other of which abuts the stop member 36. It will therefore be seen that the switch actuating arm 40 is frictionally connected to the torsion rod 28 whereby it may normally move in conformity with the torsion rod 28 but further movement of torsion rod 28 is allowed when switch actuating arm 40 reaches the limit of its motion in either direction.

In the lower portion of casing 20, a bracket 50 is secured by means of screws 51. This bracket 50 supports a pair of adjustable stop screws 52 and 53 which respectively cooperate with stop members 54 and 55 that are formed by bending over portions of the switch actuating arm 40. By adjusting these stop screws 52 and 53, the switch actuating arm 40 can be limited to varied ranges of movement. The switch actuating arm 40 is further provided with a bent over portion 56 to which is secured three switch arms 57, 58 and 59. It will be noted that the switch arms 57, 58 and 59 are provided with suitable backing members 60, 61 and 62. The arrangement is such, as indicated in the drawings, that these various switch arms and backing members are electrically insulated one from the other. The switch arm 57 cooperates with a contact screw 63, the switch arm 58 cooperates with a contact screw 64, and the switch arm 59 cooperates with a contact screw 65. The contact screws 63, 64 and 65 are all supported by brackets 50 and are insulated therefrom in any suitable manner. The arrangement is such that switch arms 57 and 58 engage their contact screws 63 and 64 upon movement of the switch actuating arm 40 in clockwise direction as viewed in Fig. 2, whereas contact arm 59 engages its contact screw 65 upon counterclockwise rotation of switch actuating arm 40 as viewed in the same figure.

As shown in Fig. 1, the bimetallic element 31 is subjected to the temperature of the gases passing through the stack pipe 11. The parts are shown in Fig. 2 in the position they assume after there has been a predetermined drop in stack temperature. Upon an increase in stack temperature, switch arm 57 is first moved from engagement with its contact screw 63 by its backing member 60. The switch arm 59 then engages its contact screw 65, and thereafter switch arm 58 is disengaged from its contact screw 64 by its backing member 61. Upon continued rise in stack temperature, the stop member 55 engages stop screw 53 whereby further movement of switch actuating arm 40 is prevented but further movement of torsion rod 28 is allowed by reason of the slip friction connection heretofore described. Switch arm 59 will flex away from its backing member 62 to permit this additional movement of switch actuating arm 40.

Upon decrease in stack temperature, stop member 55 will leave stop screw 53 and as the stack temperature continues to fall, the switch arm 58 will engage its contact screw 64 after which it will be flexed slightly so that it moves away from its backing member 61 a small amount. During this time, the backing member 62 has been moving towards switch arm 59 and upon continued stack temperature fall, the backing member 62 will move switch arm 59 from engagement with contact screw 65. Upon continued temperature fall, contact arm 57 will flex away from its backing member 60. It will be noted that the provision of backing members 60, 61 and 62, while allowing flexing of switch arms 57, 58 and 59 upon engagement with their respective contact screws 63, 64 and 65, provide for moving these switch arms 57, 58 and 59 from engagement with the respective contacts in a definite order determined by the adjustment of contact screws 63, 64 and 65. Upon slight further stack temperature fall, the stop member 54 engages stop screw 52 whereupon further rotation of switch operating arm 40 is prevented but the heretofore described slip connection allows continued rotation of torsion rod 28.

Returning now to Fig. 1 of the drawings, the room thermostat 17 comprises a bimetallic element 70 having one of its ends secured, and its other end carrying a contact blade 71. Contact blade 71 is adapted to engage a stationary or manually adjustable contact 72 when the temperature to which bimetallic element 70 responds falls to some predetermined value.

The room thermostat 17 and the switching mechanism 18 control the stoker motor 13 through a relay, generally indicated at 73. The relay 73 comprises an electromagnetic relay coil 74 which, upon energization, attracts an armature 75 and moves switch arms 76 and 77 into engagement with cooperating contacts 78 and 79. High voltage power is supplied by line wires 80 and 81. Low voltage power is supplied by a step-down transformer 82 which is provided with a low voltage secondary 83 and a high voltage primary 84 that is connected to the line wires 80 and 81. The remaining circuit connections will be described under the heading "Operation".

Operation

With the parts in the position shown, the room or space temperature is at or above the desired value since contact blade 71 is disengaged from its cooperating contact 72. The stack temperature however, has dropped the predetermined amount since switch arms 57 and 58 are engaged with their respective contact screws 63 and 64 and switch arm 59 is disengaged from its contact screw 65. The stack temperature will continue to fall but the parts of the switching mechanism 18 will stay in the positions shown. After a time, since the stoker is not operating, the room or space temperature will fall so as to bring contact blade 71 into engagement with contact 72. When this happens, relay coil 74 is energized by the following circuit: secondary 83 of transformer 82, wire 85, wire 86, bimetallic element 70, contact blade 71, contact 72, wire 87, switch arm 57, contact screw 63, wire 89, wire 90, relay coil 74 and wire 91 to the other side of secondary 83. Switch arms 76 and 77 are therefore moved into engagement with their respective contacts 78 and 79. Engagement of switch arm 77 with contact 79 establishes an energizing circuit for stoker motor 13 as follows: line wire 81, wire 92, contact 79, switch arm 77, wire 93, stoker motor 13 and wire 94 to the other line wire 80. Engagement of switch arm 76 with contact 78 establishes a holding circuit for relay coil 74 which is independent of contact blade 71 and contact 72 of the room thermostat 17. This holding circuit is as follows: secondary 83, wire 85, wire 96, contact screw 64, switch arm 58, wire 97, wire 98, contact 78, switch arm 76, wire 90, relay coil 74 and wire 91 to the other side of secondary 83.

It will be noted that immediately upon engagement of contact blade 71 with contact 72, the relay coil 74 was energized and thereupon a holding circuit therefor was established which is independent of contact blade 71 and contact 72. Therefore, if the contact blade 71 vibrates upon contact 72, the relay coil 74 will not be rapidly and intermittently energized and deenergized. In other words, the well known difficulty of relay chattering which is ever present in systems employing a single circuit sensitive switching mechanism has been eliminated by the provision of a holding circuit which is independent of the sensitive switching mechanism.

The stack temperature will rise relatively rapidly as a result of operation of the stoker, and first operates to move switch arm 57 from engagement with contact screw 63. This interrupts the initial energizing circuit for relay coil 74 but the relay coil 74 is maintained energized by the above described holding circuit. Upon further rise in stack temperature, the switch arm 59 is brought into engagement with contact screw 65. This completes a maintaining circuit for relay coil 74 which is as follows: secondary 83, wire 85, wire 86, bimetallic element 70, contact blade 71, contact 72, wire 87, switch arm 59, contact screw 65, wire 99, wire 98, contact 78, switch arm 76, wire 90, relay coil 74 and wire 91 to the other side of secondary 83. This maintaining circuit however will be ineffective or of no utility until the stack temperature rises sufficiently to move switch arm 58 from engagement with contact screw 64 whereupon the holding circuit is interrupted. When this occurs, the control of the relay coil 74 is returned to the room thermostat.

Now if the room thermostat should break the maintaining circuit by moving contact blade 71 from engagement with contact 72, the relay coil 74 will be deenergized and even though contact blade 71 immediately reengages contact 72, the relay coil cannot again be energized until such time as the stack temperature has dropped sufficiently to first move switch arm 58 into engagement with contact screw 64 then move switch arm 59 from engagement with contact screw 65 and finally move switch arm 57 into engagement with contact screw 63. In this manner, it will be seen that all possibility of relay chattering is obviated. Engagement of switch arm 58 with contact screw 64 prior to engagement of switch arm 57 with contact 63 is important since it conditions the holding circuit for completion prior to the time that it is possible to establish the initial energizing circuit. Likewise, engagement of switch arm 59 with contact screw 65 prior to disengagement of switch arm 58 from contact screw 64 upon stack temperature rise is important since this conditions the maintaining circuit for energization prior to the time that the holding circuit is interrupted and insures that the relay coil 74 will be returned to the control of the room thermostat immediately upon interruption of the holding circuit.

The provision of the temporary holding circuit for the relay coil to eliminate relay chatter by means having a definite relation to the control system as a whole as distinguished from a purely time controlled holding circuit is one of the important features of the invention.

While a specific embodiment of the invention has been herein described, it will be clear that many changes in the details of the apparatus and system can be made without departing from the spirit of the invention and I therefore intend to be limited only by the scope of the appended claims.

I claim:

1. In combination, a condition changing device, means for controlling the same, a main condition responsive element, a secondary condition responsive element responsive to predetermined changes in the value, irrespective of the actual value, of another condition which is produced directly by said condition changing device, connections between said elements and said condition changing device controlling means for placing the latter into operation by the conjoint action of said elements when the condition to which said main condition responsive element reaches a predetermined value and upon a predetermined change in the value, irrespective of the actual value, of said other condition in one direction, connections between said secondary element and condition changing device controlling means for maintaining operation of the latter independently of the main condition responsive element until said other condition changes a predetermined amount in the other direction, irrespective of the actual value of the condition, as a result of operation of said condition changing device controlling means, and other connections between said elements for thereafter returning the control of said condition changing device controlling means to said main condition responsive element.

2. In combination, a condition changing device, electromagnetic means for controlling the operation thereof, a holding switch moved to closed position upon energization of said electromagnetic means, a main controlling switch, switching means responsive to a condition directly produced by said condition changing device, an energizing circuit for said electromagnetic means controlled by said main controlling switch and switching means, a holding circuit for said electromagnetic means independent of said main controlling switch controlled by said holding switch and switching means, and a maintaining circuit for said electromagnetic means controlled by said main controlling switch and holding switch.

3. In combination, a condition changing device, electromagnetic means in control thereof, a holding switch moved to closed position upon energization of said electromagnetic means, a main controlling switch, first, second and third condition responsive switches, means responsive to a condition directly produced by said condition changing device in control of said switches for closing said third switch prior to opening said second switch upon change in the value of said condition in one direction and for closing said first switch only after said second switch closes and said third switch opens upon change in the value of said condition in the opposite direction, an initial energizing circuit for said electromagnetic means controlled by said main controlling switch and first switch in series, a holding circuit for said electromagnetic means independent of said main controlling switch including said holding switch and second switch in series, and a maintaining circuit for said electromagnetic means including said main controlling switch, holding switch and third switch in series.

4. In combination, a condition changing device, electromagnetic means in control thereof, a holding switch moved to closed position upon energization of said electromagnetic means, a main controlling switch, first, second and third condition responsive switches, means responsive to a condition directly produced by said condition changing device in control of said switches for opening said first switch and then sequentially closing said third switch and opening said second switch upon change in the value of said condition in one direction and for closing said first switch only after said second switch closes and said third switch opens upon change in the value of said condition in the opposite direction, an initial energizing circuit for said electromagnetic means controlled by said main controlling switch and first switch in series, a holding circuit for said electromagnetic means independent of said main controlling switch including said holding switch and second switch in series, and a maintaining circuit for said electromagnetic means including said main controlling switch, holding switch and third switch in series.

5. In combination, a temperature changing device, electromagnetic means in control thereof, a holding switch moved to closed position upon energization of said electromagnetic means, a main controlling switch, first, second and third condition responsive switches, means responsive to a condition directly produced by said temperature changing device in control of said switches for closing said third switch prior to opening said second switch upon change in the value of said condition in one direction and for closing said first switch only after said second switch closes and said third switch opens upon change in the value of said condition in the opposite direction, an initial energizing circuit for said electromagnetic means controlled by said main controlling switch and first switch in series, a holding circuit for said electromagnetic means independent of said main controlling switch including said holding switch and second switch in series, and a maintaining circuit for said electromagnetic means including said main controlling switch, holding switch and third switch in series.

6. In combination, a heater, electromagnetic means in control thereof, a holding switch moved to closed position upon energization of said electromagnetic means, a temperature responsive main controlling switch, first, second and third condition responsive switches, means responsive to a condition directly produced by said heater in control of said switches for closing said third switch prior to opening said second switch upon change in the value of said condition in one direction and for closing said first switch only after said second switch closes and said third switch opens upon change in the value of said condition in the opposite direction, an initial energizing circuit for said electromagnetic means controlled by said main controlling switch and first switch in series, a holding circuit for said electromagnetic means independent of said main controlling switch including said holding switch and second switch in series, and a maintaining circuit for said electromagnetic means including said main controlling switch, holding switch and third switch in series.

7. In combination, a heater, electromagnetic means for placing said heater in operation while energized, first, second and third switches, an element responsive to a heater condition for closing said third switch prior to opening said second switch upon an increase in said heater condition and for closing said first switch only after closure of said second switch and after opening of said third switch upon a decrease in said heater condition, a holding switch moved to closed position and held therein upon continued energization of said electromagnetic means, a space temperature responsive main switch, an initial energizing circuit for said electromagnetic means controlled by said main switch and said first switch, a holding circuit for said electromagnetic means controlled by said holding switch and second switch, and a maintaining circuit for said electromagnetic means controlled by said main switch, holding switch and third switch in series.

8. In combination, a heater, electromagnetic means for placing said heater in operation while energized, first, second and third switches, a thermostatic element responsive to a temperature condition directly produced by said heater for closing said third switch before opening said second switch upon an increase in said temperature condition and for closing said first switch only after closure of said second switch and after opening of said third switch upon a decrease in said temperature condition, a holding switch moved to closed position and held therein upon continued energization of said electromagnetic means, a space temperature main controlling switch, an initial energizing circuit for said electromagnetic means controlled by said main controlling switch and said first switch, a holding circuit for said electromagnetic means controlled by said holding switch and second switch, and a maintaining circuit for said electromagnetic means controlled by said main controlling switch, holding switch and third switch in series.

WILLIAM M. SCHWEICKART.